US006585402B2

United States Patent
Ohkodo et al.

(10) Patent No.: US 6,585,402 B2
(45) Date of Patent: Jul. 1, 2003

(54) VEHICLE LAMP

(75) Inventors: Masaya Ohkodo, Kanagawa-ken (JP); Hirotaka Ochiai, Kanagawa-ken (JP)

(73) Assignee: Ichikoh Industries, Ltd., Tokyo (JP)

( * ) Notice: Subject to any disclaimer, the term of this patent is extended or adjusted under 35 U.S.C. 154(b) by 0 days.

(21) Appl. No.: 09/987,825

(22) Filed: Nov. 16, 2001

(65) Prior Publication Data
US 2002/0057579 A1 May 16, 2002

(30) Foreign Application Priority Data
Nov. 16, 2000 (JP) ........................................ 2000-349521

(51) Int. Cl.[7] ................................................. F21V 8/00
(52) U.S. Cl. ........................ 362/554; 362/511; 362/517
(58) Field of Search ................................ 362/551, 554, 362/512, 517, 544, 518, 346, 297

(56) References Cited

U.S. PATENT DOCUMENTS 4,141,058 A * 2/1979 Mizohata et al. ........... 362/328
5,042,894 A * 8/1991 Swemer ...................... 385/901
5,515,243 A * 5/1996 Cassarly et al. ............ 362/298

FOREIGN PATENT DOCUMENTS

JP 2002-50210 2/2002

* cited by examiner

Primary Examiner—Thomas M. Sember
(74) Attorney, Agent, or Firm—Foley & Lardner

(57) ABSTRACT

A vehicle lamp includes a lamp housing with an open end covered with an outer lens and having first and second areas defined on the same plane. A plurality of reflectors is disposed in the first area of the housing and has respective open ends directed toward the lens, and a step is disposed in the second area of the housing. A plurality of light sources is fixedly supported with the step in the second area in association with the reflectors. A plurality of light guides include incident portions fixedly attached to the step in close proximately to the light sources and emitting portions located at substantially centers of the reflectors in front areas thereof to guide lights emitted from the light sources to the associated reflectors.

4 Claims, 4 Drawing Sheets

VEHICLE LAMP

BACKGROUND OF THE INVENTION

The present invention relates to a vehicle lamp applied to, for example, a rear combination lamp and the like.

This type of vehicle lamp is roughly constituted of: a reflector having a reflection surface consisting of a rotating parabolic surface; a light source bulb attached onto an approximate center of the reflector; and a colored outer lens covering a front open portion of the reflector. The vehicle lamp is formed so as to reflect emitted light from the light source bulb on the reflector, and to allow the reflected light to be colored by transmission through the outer lens, and then to irradiate the colored light forward in a desired light distribution pattern.

However, in the conventional vehicle lamp, since a depth of the reflector is deep and the light source bulb is attached onto the approximate center of the reflector, an attachment such as a socket is further added to the light source bulb, and a thickness of the reflector is thickened more, thus bringing a subject of enlargement of the vehicle lamp.

Moreover, in the conventional vehicle lamp, in order to attach the light source bulb onto the reflector, a bulb attachment hole must be provided in the approximate center of the reflector, thus bringing a subject that the full of the reflection surface cannot be effectively utilized.

Furthermore, in the conventional vehicle lamp, since the light source bulb is attached onto the approximate center of the reflector, a placement spot of the light source bulb is fixed, and a degree of freedom in design is narrow, thus leading to a subject of lack in originality.

In order to solve the subjects as described above, the applicants of the present invention have already proposed a technology of guiding light of a light source placed outside an area of the reflector into the reflector by a light guide (Japanese Patent Application No. 2000-234780).

SUMMARY OF THE INVENTION

The present invention is the one constituted by improving further the foregoing technology of the prior application. The present invention has an object to provide a vehicle lamp, in which a light guide is constituted by combining a plurality of light guide elements, thus facilitating forming and processing thereof at a low cost in high precision, and also enabling an emitting pattern to be set freely.

In order to achieve the foregoing object, the invention according to an aspect of the invention is a vehicle lamp, in which emitted light of a light source is reflected on a reflector, comprising: the light source provided outside the reflector; and a light guide having both end surfaces facing to the reflector and the light source respectively, the light guide being placed to make emitted light from the light source be guided into an area of the reflector, wherein the light guide is constituted by combining a plurality of light guide elements.

Therefore, according to this aspect of the invention, since the individual light guide elements can be formed to be thin or small, formation and processing thereof are simplified to bring cost reduction, and surface sink or the like is hard to occur, thus improving a light utilization efficiency.

Moreover, according to another aspect of the invention is a vehicle lamp, wherein the light guide has a structure, in which plate-shaped light guide elements are stacked in a thickness direction, each light guide element being formed in an approximate L-character shape and having an emitting portion, an incident portion and a curved portion connecting the emitting portion and the incident portion.

Therefore, according to this aspect of the invention, a curvature radius of the curved portion of the plate-shaped light guide element can be made small, thus improving the degree of freedom in design.

Moreover, according to another aspect of the invention is a vehicle lamp, wherein the light guide has a structure, in which stick-shaped light guide elements are joined in a width direction, each light guide element being formed in an approximate L-character shape and having an emitting portion, an incident portion and a curved portion connecting the emitting portion and the incident portion.

Therefore, according this aspect of the invention, incident/emitting patterns of light can be optionally set by shapes of the incident portion and the emitting portion of each light guide element.

Moreover, according to another aspect of the invention is a vehicle lamp, wherein the light guide has a structure, in which a plurality of light guide elements are stacked in such a manner that emitting portions on ends thereof are positionally shifted back and forward, and the respective emitting portions are made to face to individual reflectors.

Therefore, in the invention according to this aspect of the invention, light can be emitted from a plurality of reflectors by one light guide.

BRIEF DESCRIPTION OF THE DRAWINGS

FIG. 3A is a perspective view; and

FIG. 3B is an exploded perspective view.

FIG. 4A shows the light guide of the first embodiment; and

FIG. 4B shows the light guide of a comparative example.

FIG. 5A is a perspective view;

FIG. 5B is an exploded perspective view;

FIG. 5C is an explanatory view of an operation thereof.

FIG. 7A is a perspective view;

FIG. 7B is an exploded perspective view.

DETAILED DESCRIPTION OF THE PREFERRED EMBODIMENTS

Hereinafter, description will be made for an embodiment of the present invention with reference to the drawings.

Figure 1:
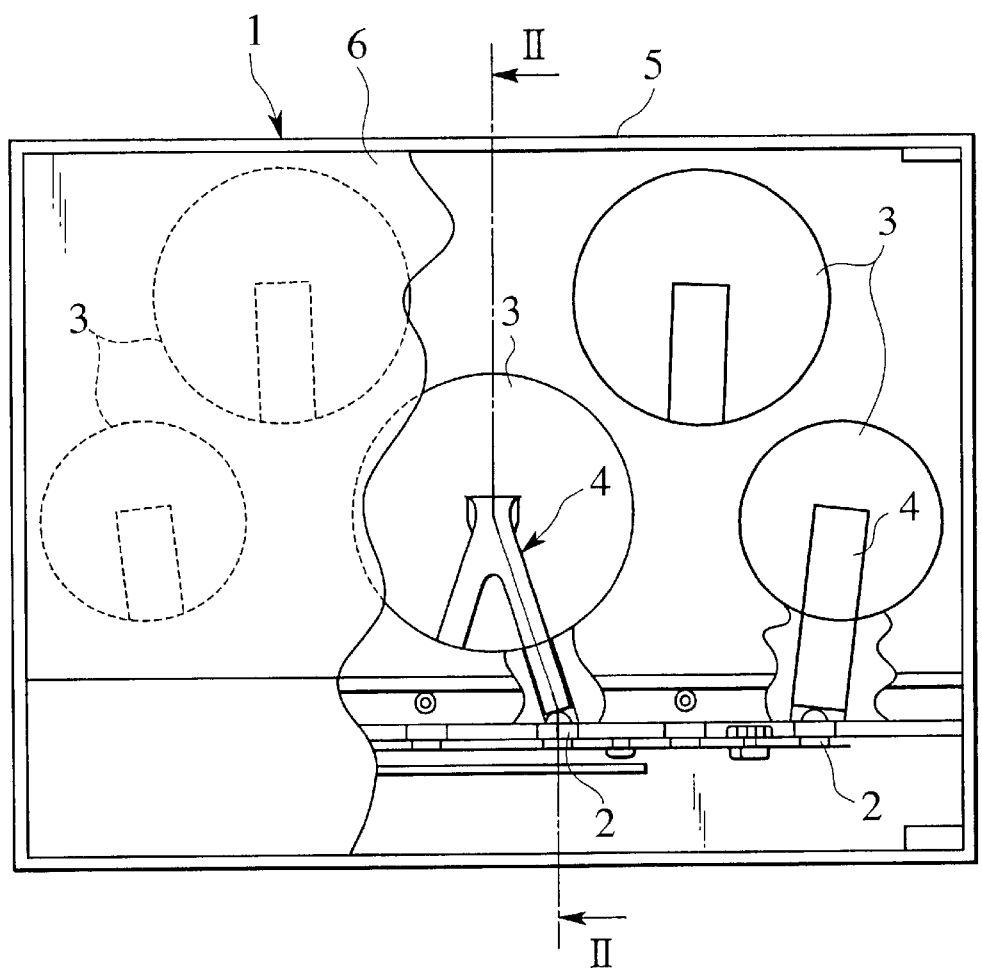
FIG. 1 is a partially cutaway plan view showing an embodiment of a vehicle lamp of the present invention.
Figure 2:
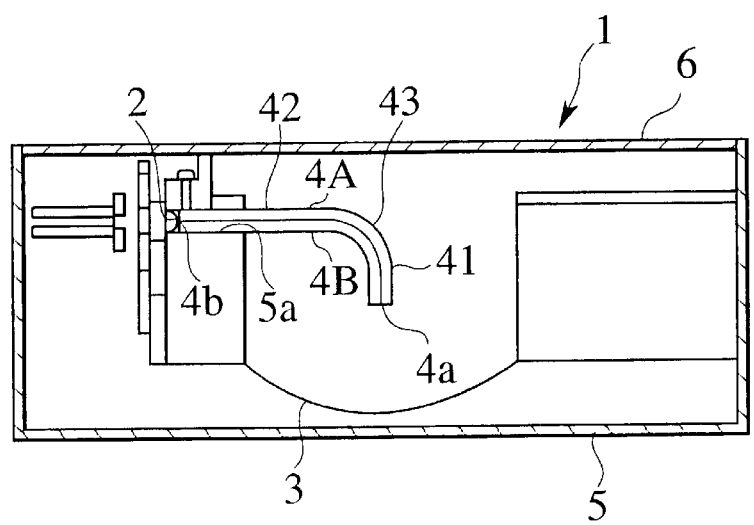
FIG. 2 is a sectional view along a line II—II of FIG. 1.

FIG. 1 and FIG. 2 show a vehicle lamp 1 as one embodiment of the present invention. The vehicle lamp 1 is constituted so as to reflect forward emitted light from light sources 2 by reflectors 3. The light sources 2 are provided outside areas of the reflectors 3, and light guides 4 are placed in such a manner that end surfaces 4a and 4b on both ends of each light guide 4 are made to face to the reflector 3 and the light sources 2 respectively to guide the emitted light from the light sources 2 into the area of the reflectors 3.

The vehicle lamp 1 is designed as a rear combination lamp. The plurality of reflectors 3 are provided in a lamp housing 5, and the plurality of light guides 4 are provided so as to face to the plurality of reflectors 3 respectively. The light sources 2 corresponding to the plurality of light guides 4 are provided respectively, and for each unit of the reflectors 3, a small lamp such as a tail lamp and a stop lamp is constituted. For the light source 2, an LED is used, and an opening of the lamp housing 5 is covered with a transparent outer lens 6.

The light guide 4 includes: an emitting portion 41 having an end surface 4a facing to the reflector 3; an incident portion 42 having an end surface 4b facing to the light source 2; and a curved portion 43 connecting the emitting portion 41 and the incident portion 42, and the light guide 4 is formed in an approximate L-character shape. And, an end of the incident portion 42 is fixedly attached onto a step 5a of the lamp housing 5 in a state where the end surface 4a is made to face to the approximate center of the reflector 3 and the other end surface 4b is made to face to the light source 2.

In this case, the light guide 4 is constituted as below by combining a plurality of light guide elements.

Figure 3A:
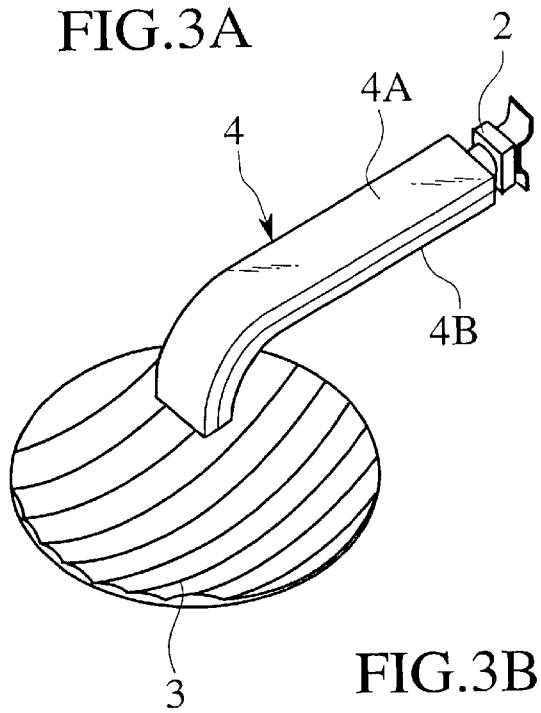
FIGS. 3A and 3B are views showing a first embodiment of a light guide applied to the vehicle lamp of the present invention.
Figure 3B:
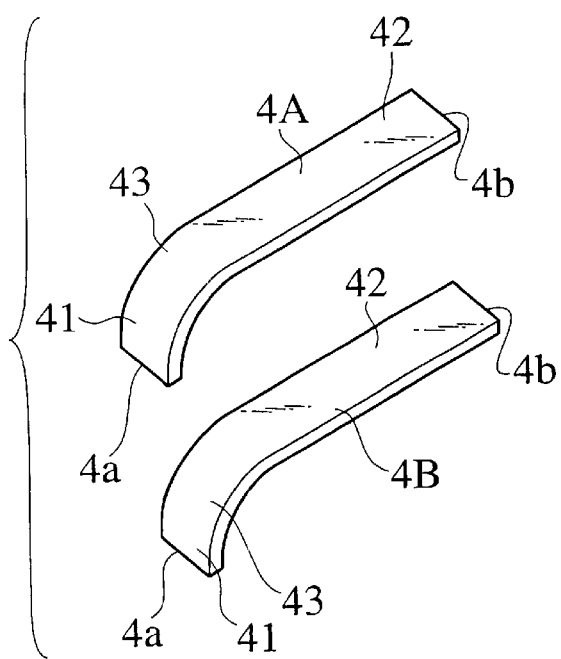

FIG. 3A and FIG. 3B show a first embodiment of the light guide applied to the vehicle lamp of the present invention, the light guide being constituted by stacking two light guide elements 4A and 4B. Specifically in the light guide of the first embodiment, plate-shaped light guide elements 4A and 4B formed in an approximate L-character shape, each including: the emitting portion 41 having the end surface 4a facing to the reflector 3, the incident portion 42 having the end surface 4b facing to the light source 2; and the curved portion 43 connecting the emitting portion 41 and the incident portion 42, are stacked in a thickness direction. Adhesion of the light guide elements 4A and 4B is carried out by optional means such as use of transparent adhesive and thermal fusing by ultrasonics. Note that, though the light guide is constituted of two light guide elements 4A and 4B in the illustrated example, the number thereof is optional.

Figure 4A:
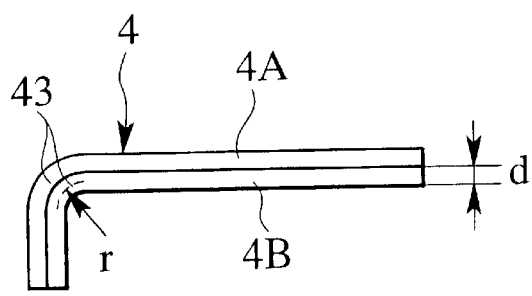
FIGS. 4A and 4B are side views of light guides.
Figure 4B:
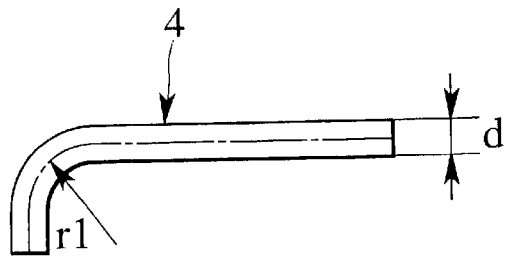

The light guide 4 is constructed in the stacked manner as described above, thus the individual light guide elements 4A and 4B can be made thin. Therefore, the cost reduction can be achieved in comparison with the conventional thick forming, and the surface sink or the like is hard to occur, thus improving the utilization efficiency of light. Moreover, as shown in FIG. 4A, such thin forming enables a curvature radius r of the curved portion 43 to be made small. Typically, with regard to the curvature radius r, where a thickness of the light guide itself is d, the following expression is satisfied: r≧d. Therefore, the thinner the thickness d is, the smaller the curvature radius r can be made, in comparison with a curvature radius r1 of a conventional light guide 4 of a one-layered structure shown in FIG. 4B (that is, r1>r), the degree of freedom in design of the light guide 4 is improved.

Figure 5A:
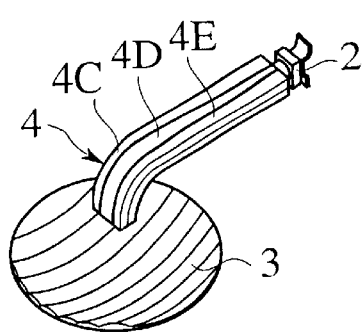
FIGS. 5A to 5C are views showing a second embodiment of the light guide applied to the vehicle lamp of the present invention.
Figure 5B:
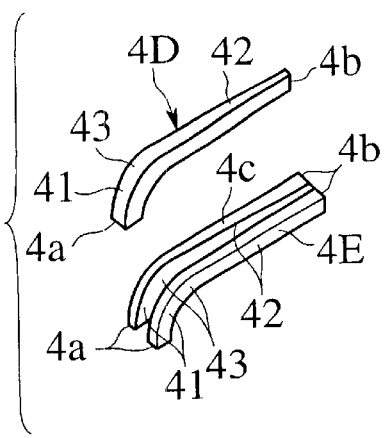
Figure 5C:
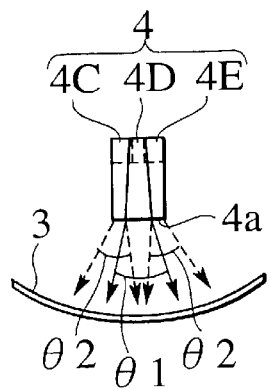

FIGS. 5A, 5B and 5C show a second embodiment of the light guide applied to the vehicle lamp of the present invention. The light guide 4 has a structure, in which stick-shaped light guide elements 4C, 4D and 4E are joined in a width direction, each of the light guide elements 4C, 4D and 4E being formed in an approximate L-character shape and having an emitting portion 41, an incident portion 42 and a curved portion 43 connecting the emitting portion 41 and the incident portion 42. Each of the light guide elements 4C and 4E on both sides of the light guide 4 has a shape, in which a width dimension thereof is gradually made smaller from the incident portion 42 to the emitting portion 41, the center light guide element 4D sandwiched by the both light guide elements 4C and 4E has a shape opposite to the light guide elements 4C and 4E, in which a width dimension thereof is gradually made larger from the incident portion 42 to the emitting portion 41.

In this case, as shown in FIG. 5C, the emitted light from the end surfaces 4a facing to the reflector 3 has a light distribution characteristic obtained by adding the emitted light from the both light guide elements 4C and 4E at an incident angle of θ2 and the emitted light from the light guide element 4D at an incident angle of θ1. As described above, in this embodiment, patterns of the emitted light from the light guide elements 4C, 4D and 4E can be controlled by designing shapes of the end surfaces 4a of the light guide elements 4C, 4D and 4E in various ways. Thus, the light distribution characteristic of the light guide 4 can be controlled.

Moreover, the shapes of the light guide elements 4C, 4D and 4E in this embodiment is optional, and for example, depending on a desired light distribution characteristic, all of the light guide elements 4C, 4D and 4E may be formed in the same shape, and the number thereof may be also optional. The light guide elements 4C and 4E on the side of the end surface 4b facing to the light source 2 may be integrated to be constituted as an integrated thing.

Figure 6:
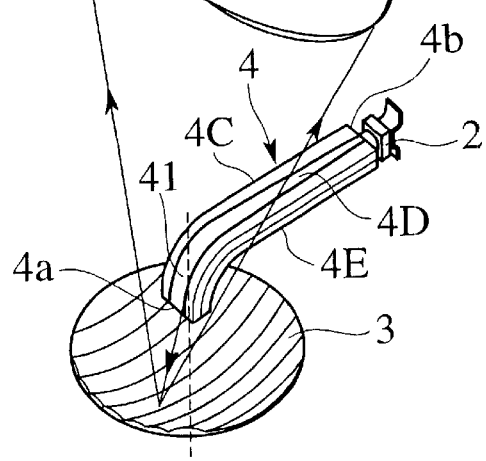
FIG. 6 is a view of an emitting pattern of the light guide of the second embodiment.

FIG. 6 shows an example of an emitting pattern by the light guide 4 of FIG. 5. From the center light guide element 4D, an approximately circular emitting pattern P1 is emitted. From the light guide elements 4C and 4E on the both sides, an approximately oval emitting pattern P2 is emitted. The emitting patterns as described above can be optionally set by the shapes (width dimensions) of the emitting portions 41 of the light guide elements 4C, 4D and 4E and a diffusion function of the reflector 3.

Figure 7A:
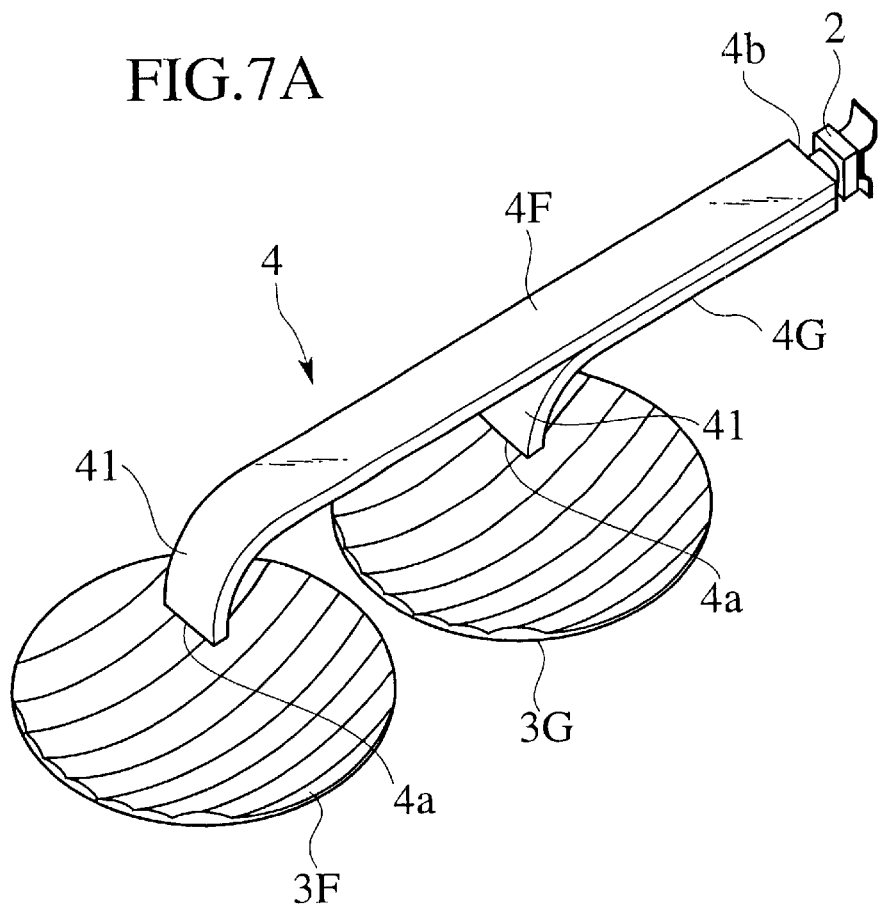
FIGS. 7A and 7B are views showing a third embodiment of the light guide applied to the vehicle lamp of the present invention.
Figure 7B:
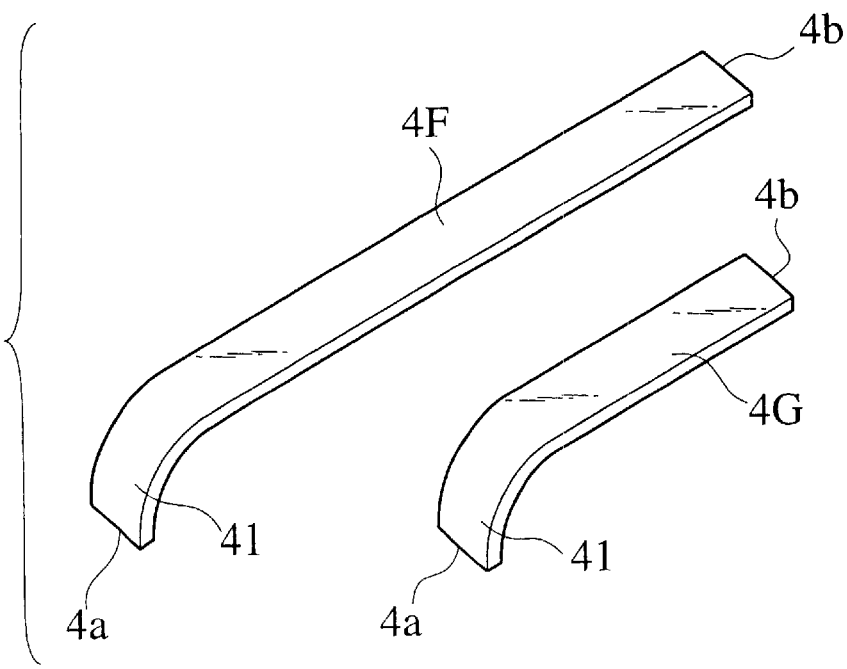

FIG. 7 shows a third embodiment of the light guide applied to the vehicle lamp of the present invention. The light guide 4 is constituted by stacking two light guide elements 4F and 4G in a thickness direction in such a manner that emitting portions 41 on ends thereof are positionally shifted back and forward. The lower light guide element 4G has a shape shorter than that of the upper light guide element 4F, and the emitting portions 41 of the respective light guide elements 4F and 4G are made to face to individual reflectors 3F and 3G. With such a structure, light can be emitted from the plurality of reflectors 3F and 3G by one light guide 4. Note that, in the illustrated example, the light guide 4 is constituted of two light guide elements 4F and 4G; however, the number thereof is optional. By increasing the number, light can be emitted from an optional number of reflectors.

As described above in detail, according to the invention in accordance with claim 1, the light guide is constructed by combining the plurality of light guide elements. Therefore, the individual light guide elements can be made thin and small, thus the cost reduction can be achieved, the surface sink is hard to occur, and the utilization efficiency of light is improved.

Moreover, according to the invention in accordance with claim 2, the light guide has a structure, in which the plate-shaped light guide elements are stacked in the thickness direction, each light guide element being formed in the approximate L-character shape and having the emitting portion, the incident portion and the curved portion. Therefore, in addition to the effect of the invention in accordance with claim 1, the further cost reduction can be achieved by thinly forming the individual plate-shaped light guide element, and the curvature radius of the curved portion can be made small, thus improving the degree of freedom in design.

Moreover, according to the invention in accordance with claim 3, the light guide has a structure, in which stick-shaped light guide elements are joined in the width direction, each light guide element being formed in the approximate L-character shape and having the emitting portion, the incident portion and the curved portion. Therefore, in addition to the effect of the invention in accordance with claim 1, the incident/emitting pattern of light can be optionally set by the shapes of the incident portion and the emitting portion of each light guide.

Moreover, according to the invention in accordance with claim 4, the light guide has a structure, in which the plurality of light guide elements are stacked in such a manner that the emitting portions on ends thereof are positionally shifted back and forward, and the respective emitting portions are made to face to the individual reflectors. Therefore, in addition to the effect of the invention in accordance with claim 1, light can be emitted from the plurality of reflectors by one light guide.

The entire content of a Japanese Application No. P2000-349521 with a filing date of Nov. 16, 2000 is herein incorporated by reference.

Although the invention has been described above by reference to certain embodiments of the present invention, the invention is not limited to the embodiments described above and will occur to those skilled in the art, in light of the teachings. The scope of the invention is defined with reference to the following claims.

What is claimed is:

1. A vehicle lamp comprising:
    a housing including first and second areas substantially aligned in the same plane and having an open end covered with a lens;
    a step disposed in the second area of the housing;
    a plurality of reflectors disposed in the first area of the housing and having respective open ends directed to the open end of the housing;
    a plurality of light sources disposed in the second area and fixedly supported on the step in correlation with respective ones of the plurality of reflectors; and
    a plurality of light guides extending from the first area toward the second area and including incident portions fixedly attached to the step in close proximity to respective ones of the plurality of light sources, and emitting portions extending from the incident portions with end surfaces terminating at substantially in a front of centers of respective ones of the plurality of reflectors to cause lights emitted from the plurality of light sources to be guided to respective ones of the plurality of reflectors.

2. The vehicle lamp according to claim 1, wherein each of the light guides includes a plurality of plate-shaped light guide elements stacked in a thickness direction, with each light guide element being formed in an approximate L-character shape and having a curved portion connected between the incident portion and the emitting portion.

3. The vehicle lamp according to claim 1, wherein each of the light guides includes stick-shaped guide elements joined in a widthwise direction, with each light guide element being formed in an approximate L-character shape and having a curved portion connected between the incident portion and the emitting portion.

4. The vehicle lamp according to claim 2, wherein each of the light guides includes a plurality of stacked light guide elements with respective emitting portions having end surfaces facing front areas of respective adjacent ones of the reflectors.

\* \* \* \* \*